US009876202B2

(12) United States Patent
Miyawaki et al.

(10) Patent No.: US 9,876,202 B2
(45) Date of Patent: Jan. 23, 2018

(54) ELECTRIC STORAGE MODULE

(71) Applicant: GS Yuasa International Ltd., Kyoto-shi (JP)

(72) Inventors: Yasutaka Miyawaki, Kyoto (JP); Yoshihiro Dote, Kyoto (JP); Hiroshi Yamashiro, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/243,824

(22) Filed: Apr. 2, 2014

(65) Prior Publication Data

US 2014/0302363 A1    Oct. 9, 2014

(30) Foreign Application Priority Data

Apr. 8, 2013  (JP) ................................. 2013-080683

(51) Int. Cl.
| H01M 2/10 | (2006.01) |
| H01M 2/20 | (2006.01) |
| H01M 10/42 | (2006.01) |
| H01M 10/48 | (2006.01) |

(52) U.S. Cl.
CPC ......... *H01M 2/1077* (2013.01); *H01M 2/206* (2013.01); *H01M 10/425* (2013.01); *H01M 10/48* (2013.01)

(58) Field of Classification Search
CPC .. H01M 10/425; H01M 10/48; H01M 2/1022; H01M 2/1077; H01M 2/206
See application file for complete search history.

(56) References Cited

U.S. PATENT DOCUMENTS

| 3,913,876 | A | * | 10/1975 | McSherry | ................ H02G 3/32 |
| | | | | | 24/484 |
| 4,481,269 | A | | 11/1984 | Barrett, Jr. | |
| 4,936,724 | A | * | 6/1990 | Dutton | .......................... 410/110 |
| D316,511 | S | * | 4/1991 | White, Jr. | ...................... D8/349 |
| D347,782 | S | * | 6/1994 | Wentzel | .......................... D8/354 |
| 6,146,788 | A | * | 11/2000 | Ikeda et al. | ................... 429/160 |
| 6,679,722 | B1 | * | 1/2004 | Pulizzi | ................. H01R 13/562 |
| | | | | | 439/451 |
| 2002/0102457 | A1 | * | 8/2002 | Oogami et al. | ............... 429/159 |
| 2006/0062538 | A1 | | 3/2006 | Araki et al. | |

(Continued)

FOREIGN PATENT DOCUMENTS

| CN | 201282170 Y | 7/2009 |
| JP | H 11-121060 A | 4/1999 |

(Continued)

OTHER PUBLICATIONS

European Search Report dated Jul. 4, 2014.

*Primary Examiner* — Carlos Barcena
(74) *Attorney, Agent, or Firm* — McGinn IP Law Group, PLLC

(57) ABSTRACT

Provided is an electric storage module including an electric storage device and an outer package member that covers the electric storage device. The outer package member has a main body that covers the electric storage device and a cable fixing portion provided on an outer surface of the main body of the outer package member. The cable fixing portion has a plurality of insertion holes through which a binding member or a cable can be inserted.

19 Claims, 5 Drawing Sheets

(56) References Cited

U.S. PATENT DOCUMENTS

| | | | |
|---|---|---|---|
| 2008/0118819 A1* | 5/2008 | Gamboa | H01M 2/0245 429/61 |
| 2011/0045329 A1* | 2/2011 | Ikeda | H01M 2/206 429/91 |
| 2012/0019061 A1 | 1/2012 | Nishihara et al. | |
| 2012/0082876 A1* | 4/2012 | Yamamoto et al. | 429/90 |
| 2012/0244397 A1* | 9/2012 | TenHouten et al. | 429/61 |
| 2012/0323511 A1 | 12/2012 | Saigo et al. | |
| 2013/0288530 A1* | 10/2013 | Zhao | H01M 2/206 439/627 |
| 2013/0302662 A1* | 11/2013 | Ogasawara et al. | 429/158 |
| 2014/0072835 A1 | 3/2014 | Tsujimura et al. | |

FOREIGN PATENT DOCUMENTS

| | | |
|---|---|---|
| JP | 2001-311408 A | 11/2001 |
| JP | 2004-289960 A | 10/2004 |
| JP | 2006-086459 A | 3/2006 |
| JP | 2009-154824 A | 7/2009 |
| JP | 2011-239619 A | 11/2011 |
| JP | 2012-090408 A | 5/2012 |
| JP | 2012-243449 A | 12/2012 |
| JP | 2013-5509 A | 1/2013 |
| JP | 2013-030312 A | 2/2013 |
| JP | 2013-062103 A | 4/2013 |
| JP | 2013-077500 A | 4/2013 |
| KR | 2002-0094744 A | 12/2002 |
| WO | WO 2010/113455 A1 | 10/2010 |
| WO | WO 2012/090340 A1 | 7/2012 |

* cited by examiner

F I G . 2
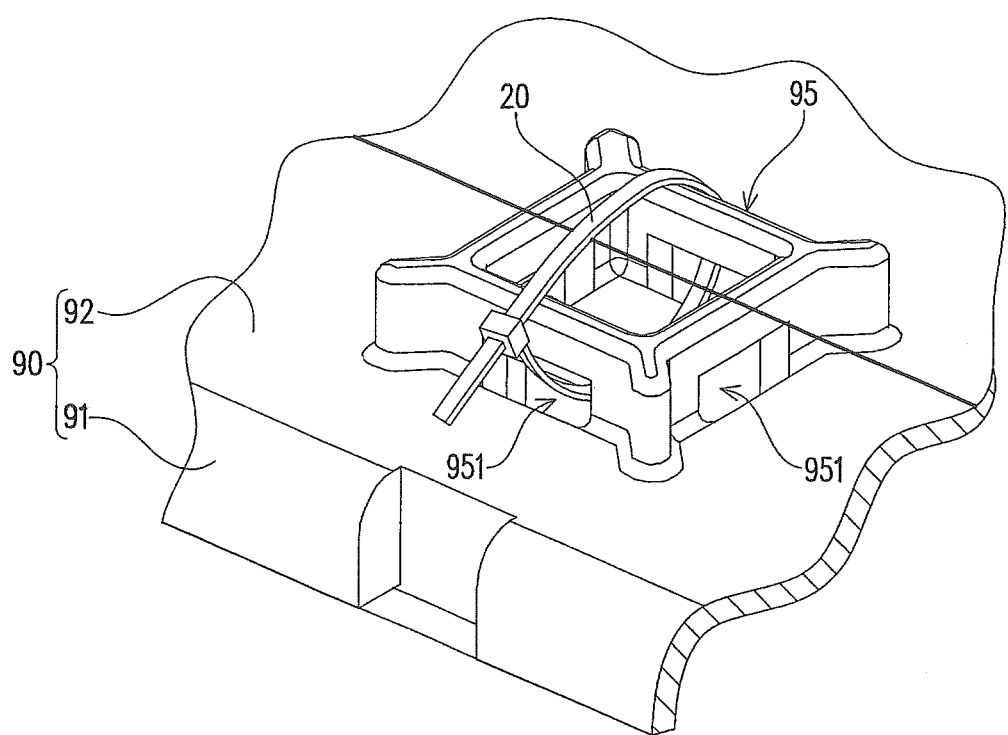

ual cable fixing portions of the same electric storage module

ELECTRIC STORAGE MODULE

CROSS-REFERENCE TO RELATED APPLICATION

This application claims priority to Japanese Patent Application No. 2013-80683, the disclosure of which is incorporated herein by reference in its entirety.

FIELD

The present invention relates to an electric storage module including an electric storage device such as a battery cell (an electric cell) or a capacitor, and an outer package member that covers the electric storage device. More specifically, the present invention relates to an electric storage module having a capability of fixing a communication cable, an electric wire such as a bus bar, or other cable laid on the outer package member.

BACKGROUND

There is a known electric storage module including electric storage devices and an outer package member that covers the electric storage devices (see JP 2013-5509 A).

The electric storage module includes a plurality of electric storage devices aligned in line in one direction and fixed to each other, an outer package member that covers the plurality of electric storage devices, and a cable laid on the outer package member. The electric storage module further includes a cable fixing portion provided on the outer package member to hold the cable.

A through-hole through which the cable is inserted penetrates the cable fixing portion in one direction. Therefore, the cable fixing portion attached to the outer package member can route the cable only in one direction. In other words, the conventional cable fixing portion has low flexibility of layout of the cable.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage module that has an enhanced flexibility of layout of a cable laid on the outside of the electric storage module.

An electric storage module according to an aspect of the present invention includes an electric storage device, and an outer package member that covers the electric storage device. The outer package member has a main body that covers the electric storage device and a cable fixing portion provided on an outer surface of the main body. The cable fixing portion has a plurality of insertion holes through which a binding member or a cable can be inserted.

BRIEF DESCRIPTION OF THE DRAWINGS

The foregoing and other features of the present invention will become apparent from the following description and drawings of an illustrative embodiment of the invention in which:

FIG. 2 is an enlarged perspective view of a portion of the cell module;

DETAILED DESCRIPTION OF THE PREFERRED EMBODIMENT

Figure 1:
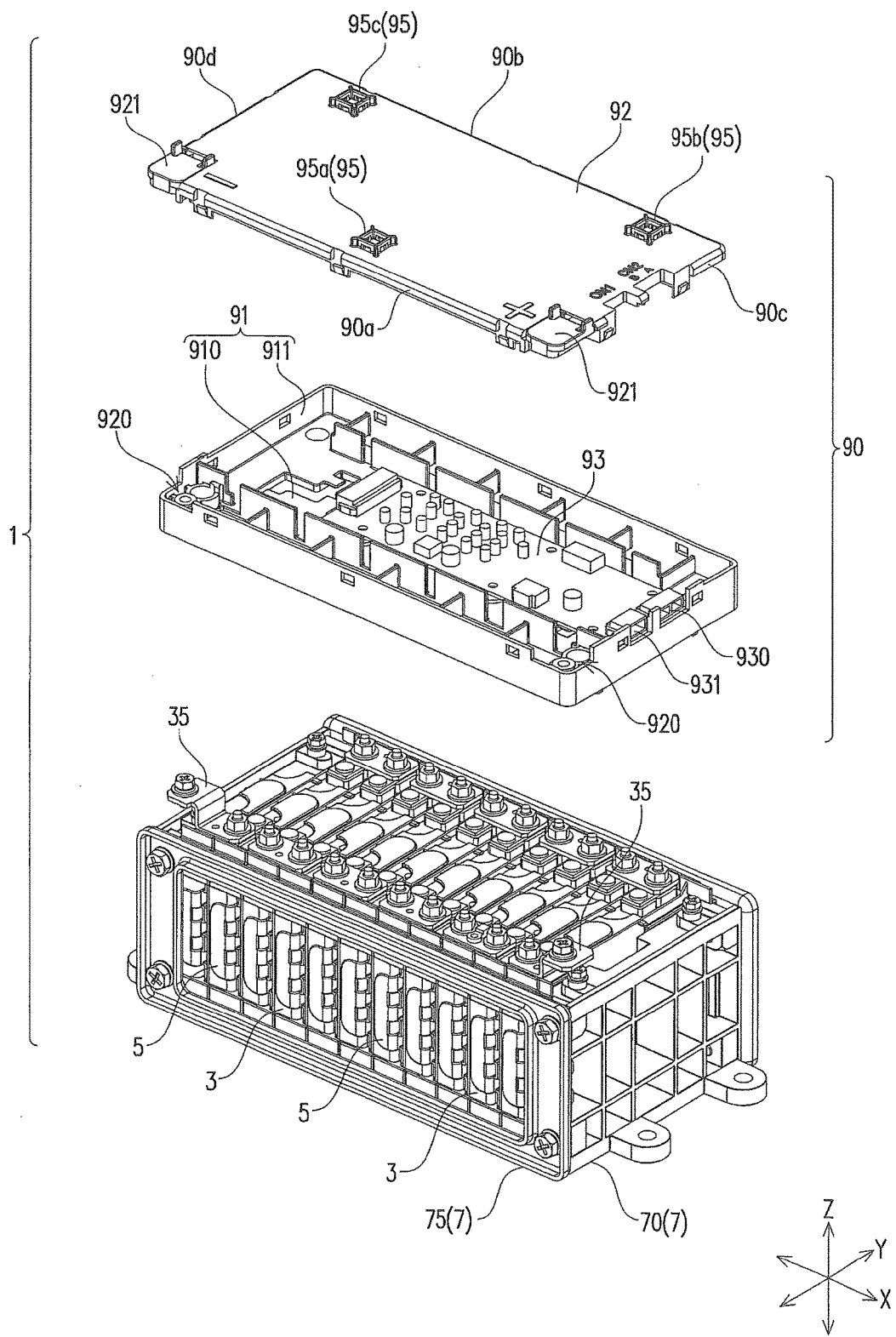
FIG. 1 is an exploded view of a cell module, which is an embodiment of an electric storage module of the present invention.

An electric storage module according to one aspect of an embodiment includes an electric storage device, and an outer package member that covers the electric storage device. The outer package member has a main body that covers the electric storage device and a cable fixing portion provided on an outer surface of the main body. The cable fixing portion has a plurality of insertion holes through which a binding member or a cable can be inserted.

With such a configuration, a cable can be fixed to the cable fixing portion by inserting the binding member or the cable through an insertion hole of the cable fixing portion. Since the cable fixing portion has the plurality of insertion holes, the flexibility of positioning the binding member or cable to be fixed is enhanced. Therefore, the electric storage module has higher flexibility of layout of the cable. The cable may be a communication cable or an electric wire such as a bus bar.

According to another aspect, the plurality of insertion holes may be disposed in such a manner that directions of insertion intersect with each other.

With such a configuration, since the plurality of insertion holes are formed in the cable fixing portion in such a manner that directions of insertion intersect with each other, the flexibility of layout of the cable is enhanced.

According to still another aspect, the cable fixing portion may protrude from the outer surface of the main body.

With such a configuration, since the cable fixing portion protrudes from the outer surface of the main body, the binding member or the cable can be easily inserted through the insertion holes.

The main body of the outer package member and the cable fixing portion may be integrated with each other.

With such a configuration, since the main body of the outer package member and the cable fixing portion are integrated with each other, the step of mounting the cable fixing portion onto the main body is omitted.

According to still another aspect, it may be configured that the outer package member has three or more cable fixing portions, one of three cable fixing portions of the three or more cable fixing portions is disposed at a central point along one edge of the main body, and the remaining two cable fixing portions of the three cable fixing portions are disposed at an interval along another edge of the main body.

With such a configuration, when the plurality of electric storage modules are arranged side by side, a cable can be laid in a serpentine shape along the shortest possible path. Since each electric storage module has three or more cable fixing portions, and each of the cable fixing portions has the plurality of insertion holes, the cable passed between adjacent electric storage modules can be appropriately oriented and fixed in an arbitrary direction by the cable fixing portions.

In this case, the remaining two cable fixing portions of the three cable fixing portions may be symmetrically disposed with respect to the one cable fixing portion of the three cable fixing portions.

With such a configuration, since the remaining two cable fixing portions are symmetrically disposed with respect to the one cable fixing portion, the cable fixing portion disposed on an electric storage module at the central point may face the cable fixing portion disposed on an adjacent electric storage module at the central point, or the remaining two cable fixing portions disposed on an electric storage module at an interval may face the remaining two cable fixing portions disposed on an adjacent electric storage module at an interval from each other. The cable fixed to the cable fixing portions disposed as described above can be laid along the shortest possible path.

According to still another aspect, it may be configured that the outer package member includes a positive outside terminal to which a bus bar can be connected and a negative outside terminal to which a bus bar can be connected, and the cable fixing portion orients and fixes a cable in such a manner that the cable is laid to intersect with the bus bar connected to the positive outside terminal or the negative outside terminal.

With such a configuration, since the cable is laid to intersect with the bus bar, even if a current flowing through the bus bar produces a magnetic field, the cable is less likely to be affected by the magnetic field. As a result, signals transmitted by the cable are less susceptible to noise due to the magnetic field.

In this case, the cable fixing portion may be provided at such a point as not to interfere with the bus bar.

With such a configuration, the cable can be fixed at a lower level than in the case where the cable fixing portions are provided on the bus bar.

According to still another aspect, it may be configured that the electric storage module further includes a control board that monitors the electric storage device, and the main body has a connection terminal for a communication cable, the connection terminal being connected to the control board.

With such a configuration, since the control board is housed in the outer package member, and the main body of the outer package member has a connection terminal for a communication cable, a communication cable can be connected to the connection terminal of each of adjacent electric storage modules.

According to still another aspect, it may be configured that the outer package member includes a circuit case that is disposed on the electric storage device and forms the outer surface of the main body, and the cable fixing portion may be provided on an outer surface of the circuit case.

According to still another aspect, it may be configured that the circuit case has a circuit case body having an opening and a cover plate that covers the opening, and the cable fixing portion is provided on an outer surface of the cover plate.

According to still another aspect, it may be configured that the electric storage module further includes a binding member that is inserted through at least one of the plurality of insertion holes and fixed to the cable fixing portion and fixes the cable to the cable fixing portion.

According to still another aspect, the cable fixing portion has two insertion holes opposed to each other at a distance, and the binding member is inserted through the two insertion holes and fixed to the cable fixing portion.

According to still another aspect, the cable fixing portion may have two insertion holes opposed to each other at a distance in a first direction and two insertion holes opposed to each other at a distance in a second direction that intersects with the first direction.

The above-described aspects can provide an electric storage module that has enhanced flexibility of layout of a cable on the outside of the electric storage module.

In the following, a cell module, which is an embodiment of an electric storage module of the present invention, is described with reference to the drawings.

Figure 5:
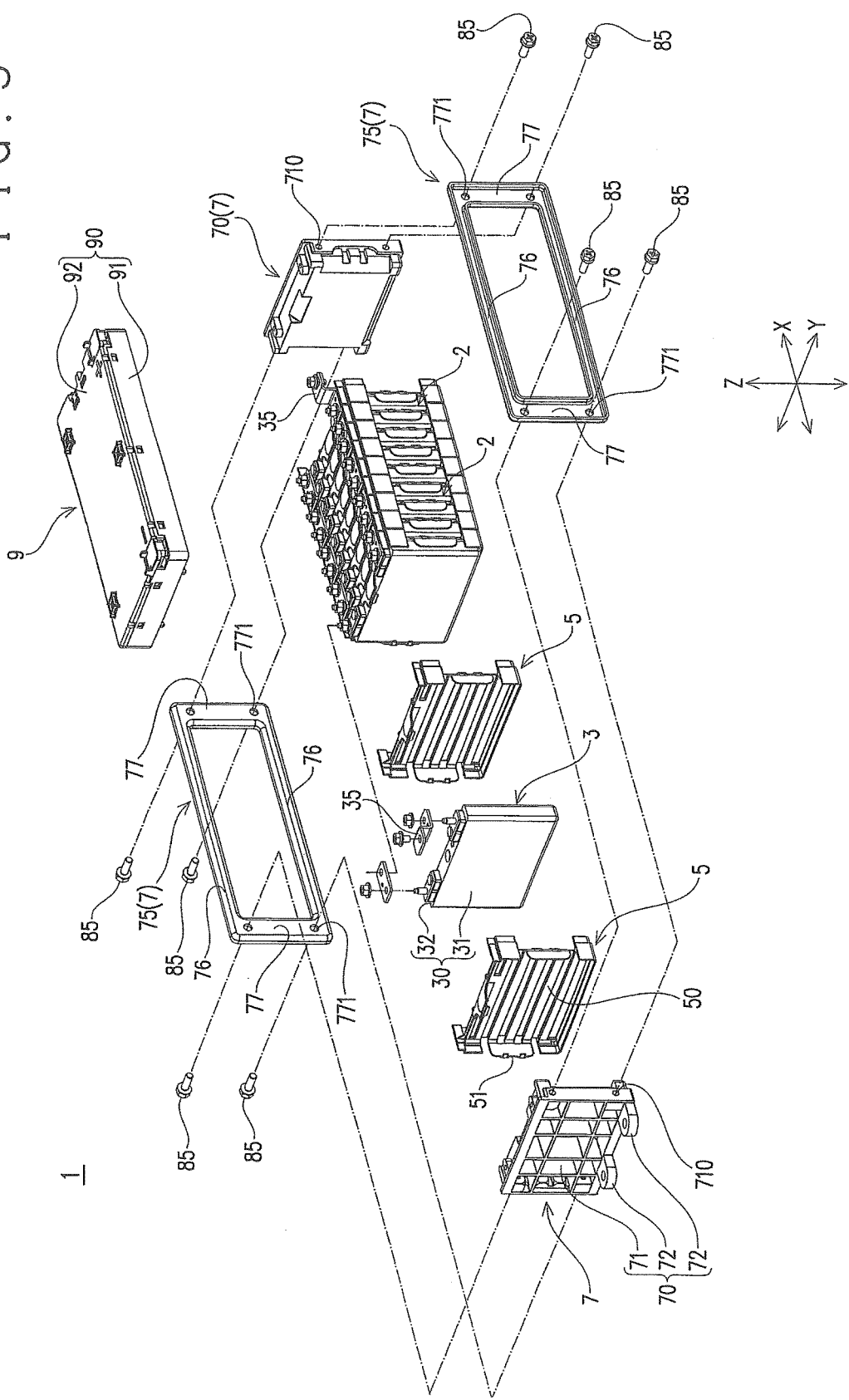
FIG. 5 is an exploded view of the cell module.

As shown in FIGS. 1 and 5, a cell module 1 has a plurality of battery cells (electric storage devices) 3. More specifically, the cell module 1 includes a plurality of battery cells 3 aligned in a first direction, a plurality of spacers 5 disposed between adjacent battery cells 3 and at the opposite ends of the plurality of battery cells 3 in the first direction, a frame (a holder) 7 that holds the plurality of battery cells 3 and the plurality of spacers 5 to package them together, and a cell monitor circuit module 9 (cell monitor unit: CMU) that monitors at least one of the voltage, the current and the temperature of each of the plurality of battery cells 3.

In the following description, for the sake of convenience, the first direction is referred to as an X direction (which is the direction along the X axis of the orthogonal axes shown in the drawings). A second direction, which is orthogonal to the first direction, is referred to as a Y direction (which is the direction along the Y axis of the orthogonal axes shown in the drawings). A third direction, which is orthogonal to both the first and second directions, is referred to as a Z direction (which is the direction along the Z axis of the orthogonal axes shown in the drawings). In the drawings, a symbol X, Y or Z is appended to one of the heads of each two-way arrow indicating the X direction, the Y direction or the Z direction. Provided that the Z direction is vertical, the Z direction means the up-and-down direction, the Y direction means the left-and-right direction, and the X direction means the front-and-back direction.

As shown in FIG. 5, the battery cell 3 includes a case 30 having a case body 31 having an opening and a cover plate 32 that covers and seals the opening of the case body 31. An electrode assembly (not shown) including a positive electrode plate and a negative electrode plate insulated from each other is housed in the case 30. The battery cell 3 is a rectangular cell flattened in the X direction.

The spacer 5 is made of a synthetic resin and has insulating properties. The spacer 5 includes a spacer body 50 and holding portions 51 that extend from the spacer body 50 in the X direction and hold the battery cell 3 that faces the spacer body 50 in the X direction. The spacer body 50 has a substantially rectangular shape that conforms to the rectangular shape of the case 30 of the battery cell 3 viewed in the X direction.

The frame 7 includes a pair of end members (so-called end plates) 70 and coupling members 75. The pair of end members 70 are disposed on the opposite sides of the plurality of battery cells 3 in the X direction and hold therebetween the plurality of battery cells 3 and the plurality of spacers 5 in the X direction. The coupling members 75 couple the pair of end members 70 to each other to secure the plurality of battery cells 3 and the plurality of spacers 5 together. The coupling member 75 includes a pair of horizontal beams 76 provided at an interval from each other in the Z direction and extending in parallel with each other in the X direction, and a pair of vertical beams 77, one of which couples the pair of horizontal beams 76 at one ends in the X direction, and the other of which couples the pair of horizontal beams 76 at the other ends in the X direction. The coupling member 75 has a rectangular frame shape as a whole.

The end members 70 are molded or otherwise formed from a metal such as aluminum. The end member 70 includes an end member body 71 and leg portions 72 that protrude outward in the X direction from the bottom portion of the end member body 71. As with the spacer body 50, the end member body 71 has a substantially rectangular shape that conforms to the rectangular shape of the case 30 of the battery cell 3 viewed in the X direction. The end member body 71 has a rectangular frame portion and a lattice of ribs formed inside the frame portion. The end member body 71 is lightweight although it has a certain thickness in the X direction, and is rigid. The end member 70 is provided with a pair of leg portions 72 at an interval from each other in the Y direction. A through-hole (not numbered), through which a threaded portion of a bolt is to be inserted, penetrates each leg portion 72 in the Z direction.

The coupling member 75 is provided in pair to be disposed respectively on the opposite sides of the plurality of battery cells 3 in the Y direction. That is, each coupling member 75 is disposed to face the plurality of battery cells 3 on one side of the plurality of battery cells 3 in the Y direction, and the other coupling member 75 is disposed to face the plurality of battery cells 3 on the other side of the plurality of battery cells 3 in the Y direction.

The cell monitor circuit module 9 is an outer package member. As shown in FIGS. 1 and 5, the cell monitor circuit module 9 includes a circuit case body (circuit case) 90 and cable fixing portions 95 provided on the outer surface of the circuit case body 90. The cell monitor circuit module 9 further includes a control board 93 on which a cell monitor circuit is mounted, housed in the circuit case body 90. The circuit case body 90 is disposed on/arranged over the plurality of battery cells 3. The circuit case body 90 includes a case 91 having an opening and a cover plate 92 that covers and seals the opening of the case 91. The case 91 includes a rectangular bottom plate 910 and a circumferential wall portion 911 standing along the circumferential edge of the bottom plate 910. The cover plate 92 also has a rectangular shape.

In the following, one long side of the circuit case body 90 extending in the X direction is referred to as a first edge 90a. The other long side extending in the X direction in parallel with the first edge 90a is referred to as a second edge 90b. One short side extending in the Y direction and connecting one end of the first edge 90a and one end of the second edge 90b to each other is referred to as a third edge 90c. The other short side extending in the Y direction and connecting the other end of the first edge 90a and the other end of the second edge 90b to each other is referred to as a fourth edge 90d.

The control board 93 on which the cell monitor circuit is mounted includes an input connector 930 and an output connector 931, which are connection terminals. Connectors provided on both one ends of a pair of communication cables 2 connected to a battery management unit (BMU) 10 (see FIG. 3) are coupled to the input connector 930 and the output connector 931, respectively. Since an input connector from the outside of the circuit case body 90 is coupled to the output connector 931, the output connector 931 is open to the outside of the circuit case body 90. To this end, a part of the circumferential wall portion 911 of the case 91 corresponding to the output connector 931 is cut out to form an opening.

The cover plate 92 is removably fitted into and covers an opening formed by the circumferential wall portion 911 of the case 91, the opening facing in the Z direction. As shown in FIG. 1, the cover plate 92 has openings 920 through which a pair of outside terminals 35 are exposed at points where the cover plate 92 faces the outside terminals 35, that is, a corner including the intersection of the first edge 90a and the third edge 90c and a corner including the first edge 90a and the fourth edge 90d. To prevent the outside terminals 35 from being normally exposed, the cover plate 92 has caps 921 that can open and close the openings 920.

The cable fixing portions 95 fix the communication cables 2. The cable fixing portions 95 are provided on the outer surface of the cover plate 92. In this embodiment, the cable fixing portions 95 protrude from the outer surface of the cover plate 92 at a plurality of points. The cable fixing portions 95 are formed integrally with the cover plate 92. For example, three cable fixing portions 95 protrude from the outer surface of the cover plate 92 at three points. In this case, a first cable fixing portion 95a protrudes at a central point of the first edge 90a. In other words, the first cable fixing portion 95a protrudes from the first edge 90a of the cover plate 92 at a central or substantially central point along the stacking direction (the X direction) of the battery cells 3. In some cases, the cell monitor circuit module 9 may be disposed shifting toward one of the end members 70. In such cases, the first cable fixing portion 95a protrudes on the outer surface of the cover plate 92 at a central or substantially central point in the X direction of a line connecting the through-hole of the leg portion 72 of one end member 70 and the through-hole of the leg portion 72 of the other end member 70.

A second cable fixing portion 95b protrudes on the second edge 90b at a point close to the third edge 90c. A third cable fixing portion 95c protrudes on the second edge 90b at a point close to the fourth edge 90d. The second cable fixing portion 95b and the third cable fixing portion 95c are disposed symmetrically with respect to the first cable fixing portion 95a. That is, the distance between the first cable fixing portion 95a and the second cable fixing portion 95b is equal to the distance between the first cable fixing portion 95a and the third cable fixing portion 95c. The distance between the first cable fixing portion 95a and the second cable fixing portion 95b and the distance between the first cable fixing portion 95a and the third cable fixing portion 95c each are shorter than the distance between the second cable fixing portion 95b and the third cable fixing portion 95c.

Insertion holes 951, through which a band-shaped binding member 20 (see FIG. 2), for example, can be inserted, are formed in the cable fixing portion 95. As shown in FIGS. 1 and 2, the insertion holes 951 are formed so that the binding member 20 can be inserted in two directions (the X direction and the Y direction in this embodiment) intersecting with the Z direction, in which the cable fixing portion 95 protrudes. In this embodiment, the cable fixing portion 95 has two insertion holes 951 opposed to each other at a distance in the X direction and two insertion holes 951 opposed to each other at a distance (the Y direction, for example) in a direction intersecting with the X direction.

In the cell module 1 configured as described above, as shown in FIG. 5, the plurality of battery cells 3 are stacked in the X direction with the spacers 5 interposed between the battery cells 3. The spacers 5 are also disposed on the outer sides of the outermost ones of the plurality of battery cells 3. Furthermore, the pair of end members 70 are disposed on the outer sides of the pair of outermost spacers 5. With a compression force in the X direction applied across the pair of end members 70, the pair of coupling members 75 are disposed to hold therebetween the plurality of battery cells 3 in the Y direction. Threaded portions of bolts 85 inserted in through-holes 771 of the coupling members 75 are screwed into female threads 710 in the end members 70, thereby integrating the plurality of battery cells 3 and the plurality of spacers 5 with the frame 7. Next, the cell monitor circuit module 9 is placed on and attached to the plurality of battery cells 3 from the Z direction, and the battery module 1 is completed.

Figure 3:
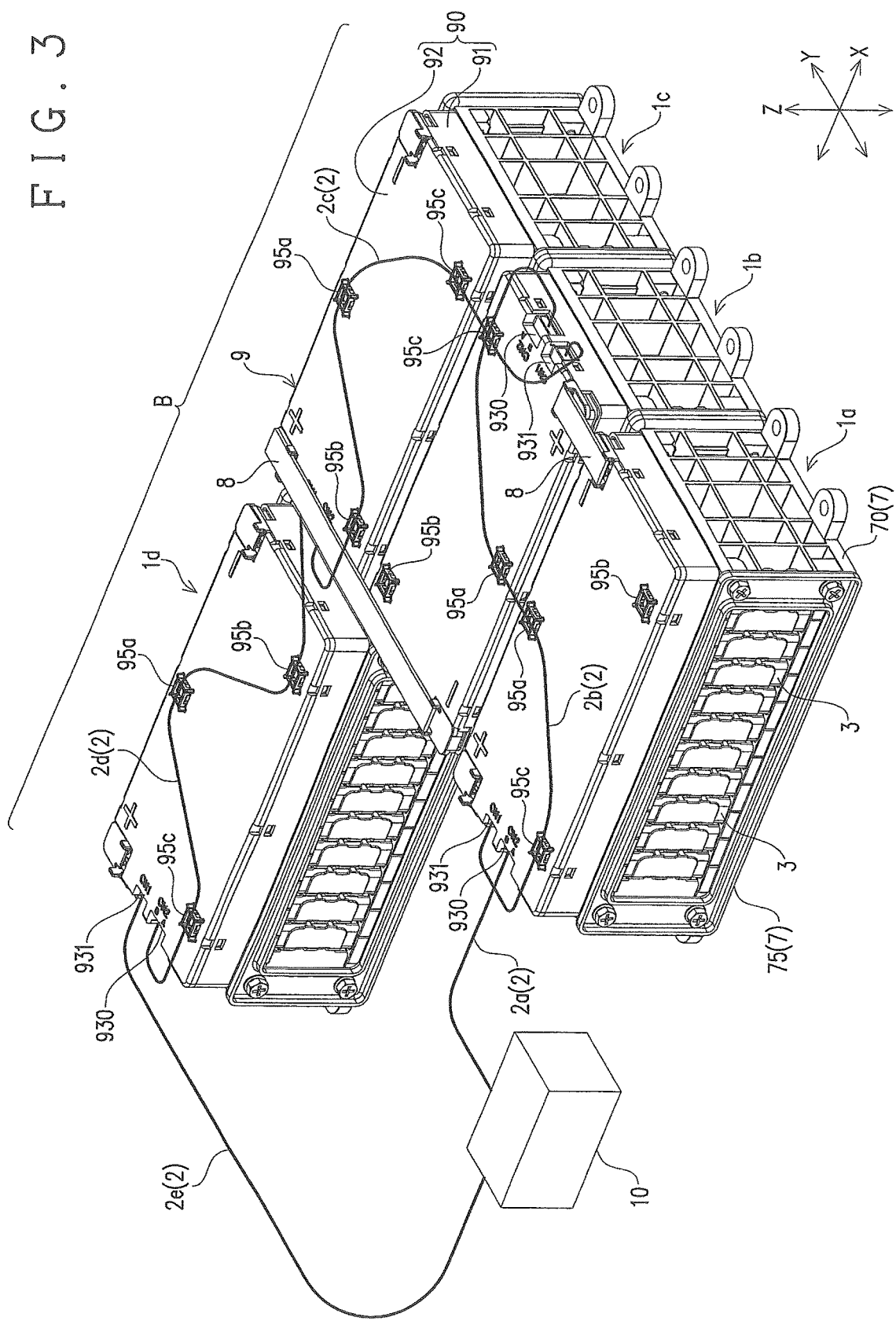
FIG. 3 is a perspective view of an electric storage apparatus including a plurality of cell modules arranged side by side.

For example, as shown in FIG. 3, a plurality of (four in FIG. 3) cell modules 1 are arranged side by side to form an electric storage apparatus B. In the electric storage apparatus B shown in FIG. 3, a first cell module 1a, a second cell module 1b and a third cell module 1c are arranged side by side in the Y direction, and a fourth cell module 1d is arranged side by side with the third cell module 1c in the X direction. In the electric storage apparatus B, the coupling members 75 face each other between adjacent two of the first cell module 1a, the second cell module 1b and the third cell module 1c, and the end members 70 of the third cell module 1c and the fourth cell module 1d face each other.

An outside terminal of a negative electrode of the first cell module 1a and an outside terminal of a positive electrode of the second cell module 1b are electrically connected to each other by a bus bar 8. An outside terminal of a negative electrode of the second cell module 1b and an outside terminal of a positive electrode of the third cell module 1c are also electrically connected to each other by a bus bar 8. The cable fixing portions 95 are formed at such points as not to interfere with the bus bars 8. The bus bar 8 includes a conductive core body and an insulator covering the core body.

The cell modules 1a, 1b and 1c adjacent to each other are disposed in such a manner that the input connector 930 and the output connector 931 of each cell module face in the opposite direction to those of an adjacent cell module. Connectors of first to sixth communication cables 2a to 2f are connected to the input connectors 930 and the output connectors 931 of the cell modules 1a, 1b, 1c and 1d.

More specifically, the first communication cable 2a is connected to an output terminal of the BMU 10 and the input connector 930 of the first cell module 1a. The second communication cable 2b is connected to the output connector 931 of the first cell module 1a and the input connector 930 of the second cell module 1b. The third communication cable 2c is connected to the output connector 931 of the second cell module 1b and the input connector (hidden below the bus bar 8) of the third cell module 1c. The fourth communication cable 2d is connected to the output connector (hidden below the bus bar 8) of the third cell module 1c and the input connector 930 of the fourth cell module 1d. The fifth communication cable 2e is connected to the output connector 931 of the fourth cell module 1d and an input terminal of the BMU 10.

The second communication cable 2b is oriented and fixed in the X direction at the third cable fixing portion 95c of the first cell module 1a and then oriented and fixed in the Y direction at the first cable fixing portion 95a of the first cell module 1a. The second communication cable 2b is fixed by the binding member 20 (see FIG. 2) inserted in the insertion hole 951 of the cable fixing portion 95. More specifically, the binding member 20 is inserted through at least one of the plurality of insertion holes 951 formed in the cable fixing portion 95 and binds a part of the cable fixing portion 95 (a part that defines the insertion hole 951 through which the binding member 20 is inserted) and the second communication cable 2b to each other. In the example shown in FIG. 2, the binding member 20 is inserted through two insertion holes 951 facing each other at a distance in the Y direction and fixes the second communication cable 2b to the cable fixing portion 95. The second communication cable 2b is then oriented and fixed in the Y direction at the first cable fixing portion 95a of the second cell module 1b and then oriented and fixed in the X direction at the third cable fixing portion 95c of the second cell module 1b.

The third communication cable 2c is oriented and fixed in the Y direction at the third cable fixing portion 95c of the second cell module 1b and then oriented and fixed in the Y direction at the third cable fixing portion 95c of the third cell module 1c. The third communication cable 2c is then oriented and fixed in the X direction at the first cable fixing portion 95a of the third cell module 1c and then oriented and fixed in the X direction at the second cable fixing portion 95b of the third cell module 1c. At the bus bar 8 that electrically connects the second cell module 1b and the third cell module 1c to each other, the third communication cable 2c runs orthogonal to the bus bar 8. The fourth communication cable 2d is oriented and fixed in the X direction at the cable fixing portions 95b, 95a and 95c of the fourth cell module 1d.

As described above, the plurality of insertion holes 951 are formed in the cable fixing portion 95 so as to have two insertion directions, the X direction and the Y direction, intersecting with each other. Therefore, the cable fixing portion 95 can fix communication cables 2 oriented in two different directions with the binding member 20. The third cable fixing portion 95c of the second cell module 1b orients and fixes the second communication cable 2b in the X direction and orients and fixes the third communication cable 2c in the Y direction. That is, the cell module 1 can orient and fix a communication cable 2 in either of two directions at one cable fixing portion 95.

The communication cables 2 are laid by passing each cable from a cable fixing portion 95 to another cable fixing portion 95 closest to the cable fixing portion 95. The plurality of communication cables 2 are laid in a serpentine shape by passing the communication cables 2 between the cable fixing portions 95. Since the communication cables 2 are laid along the shortest possible path, the communication cables 2 do not significantly oscillate or vibrate even if the cell module 1 oscillates or vibrates. Such a non-significant oscillation or vibration is unlikely to cause a break of a communication cable 2 or drop-off of a connector.

The BMU 10 detects the voltage, the current or the like of each cell module 1, thereby detecting a battery cell 3 in an abnormal state. If a large number of battery cells 3 are connected, a high current flows through each bus bar 8. Accordingly, a strong magnetic field is produced around the bus bar 8. In this embodiment, however, the communication cable 2 laid at the bus bar 8 is orthogonal to the bus bar 8, so that signals transmitting through the communication cable 2 are less likely to be affected by the magnetic field produced around the bus bar 8. Accordingly, signals transmitting through the communication cables 2 are less susceptible to noise due to the magnetic field. Accordingly, the BMU 10 can accurately follow or acquire the state of each cell module 1. In the case where the electric storage apparatus B is mounted on an automobile or the like, more communication cables 2 are laid. In that case, the communication cables 2 need to be laid with higher efficiency.

Figure 4:
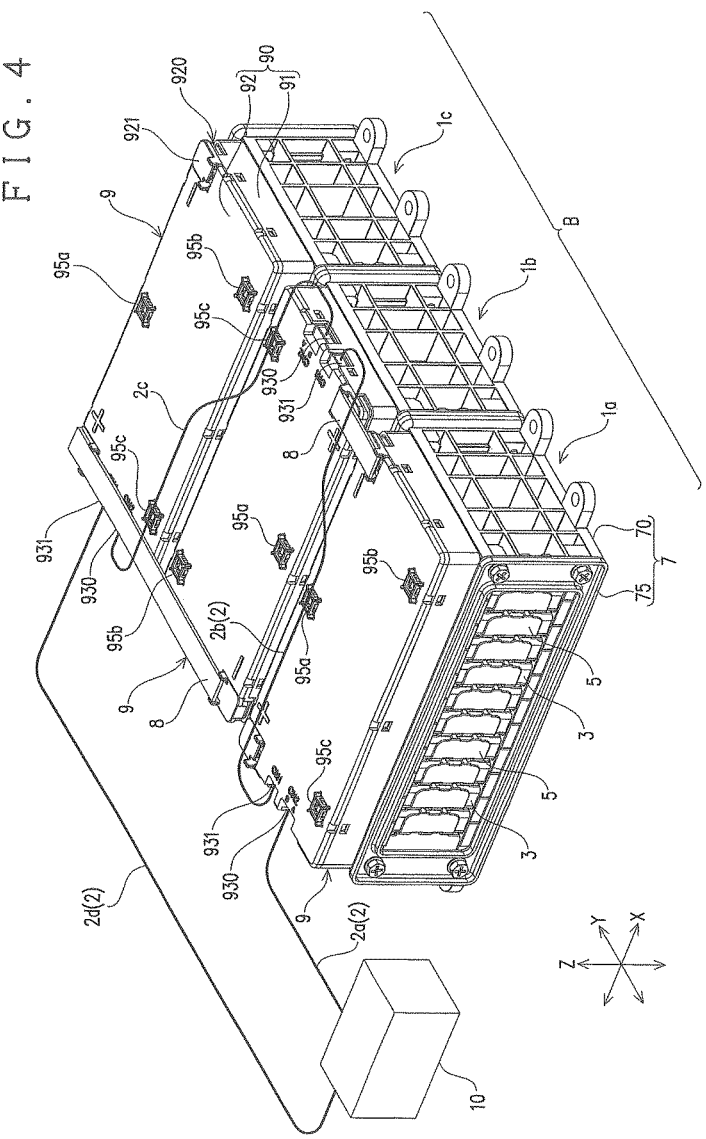
FIG. 4 is a perspective view of an electric storage apparatus different from that shown in FIG. 3, which also includes a plurality of cell modules arranged side by side.

To satisfy the need, the communication cable 2 may be passed from a cable fixing portion 95 to another cable fixing portion 95 that is not the closest to the cable fixing portion 95. The communication cable 2 may be oriented and fixed in the same direction at a plurality of cable fixing portions 95. A case where the communication cable 2 is oriented and fixed in the same direction is described with reference to the electric storage apparatus B shown in FIG. 4. In the electric storage apparatus B shown in FIG. 4, the first cell module 1a, the second cell module 1b and the third cell module 1c are arranged side by side in the Y direction. The coupling members 75 face each other between adjacent two of the cell modules 1a, 1b and 1c.

In the electric storage apparatus B, the first communication cable 2a is connected to the output terminal of the BMU 10 and the input connector 930 of the first cell module 1a. The second communication cable 2b is connected to the output connector 931 of the first cell module 1a and the input connector 930 of the second cell module 1b. The third communication cable 2c is connected to the output connector 931 of the second cell module and the input connector 930 of the third cell module. The fourth communication cable 2d is connected to the output connector 931 of the third cell module and the input terminal of the BMU 10.

The second communication cable 2b is oriented and fixed in the X direction at the first cable fixing portion 95a of the first cell module 1a. The third communication cable 2c is oriented and fixed in the X direction at the third cable fixing portion 95c of the second cell module 1b and oriented and fixed in the X direction at the third cable fixing portion 95c of the third cell module 1c. In this wiring pattern, none of the second cable fixing portions 95b is used. The communication cables 2 are oriented and fixed in the X direction at all the cable fixing portions 95.

In the electric storage apparatus B, the plurality of cell modules 1 are daisy-chained to each other by the communication cables 2. Therefore, in the electric storage apparatus B, the BMU 10 recognizes the state of the battery cells 3 in each cell module 1 and detects any battery cell 3 in the abnormal state. The communication cables 2 are fixed by the cable fixing portions 95 and therefore are less likely to get caught by another component or the like. Therefore, the communication cables 2 are less likely to break.

In addition, in the cell module 1 described above, the cable fixing portions 95 have a plurality of insertion holes 951 formed in such a manner that directions of insertion (penetration) intersect with each other. As a result, the cable fixing portions 95 can orient and fix communication cables 2 in a plurality of directions. Thus, the cell modules 1 have high flexibility of layout of the communication cables 2.

In addition, in the cell module 1 described above, the communication cables 2 are laid to intersect with the bus bars 8. Therefore, even if a current flowing through the bus bars 8 produces a magnetic field, the communication cables 2 are less likely to be affected by the magnetic field. As a result, signals transmitting through the communication cables 2 are less susceptible to noise due to the magnetic field.

In addition, in the cell module 1 described above, the cable fixing portions 95 are provided at such points as not to interfere with the bus bars 8. As a result, the communication cables 2 can be fixed at a lower level or height than in the case where the cable fixing portions 95 are provided on the bus bars 8.

In addition, in the cell module 1 described above, the cable fixing portions 95 are integrated with the circuit case body 90. As a result, in manufacture of the cell module 1, the step of mounting the cable fixing portions 95 onto the circuit case body 90 is omitted.

In addition, in the electric storage apparatus B including an array of a plurality of cell modules 1 described above, the communication cables 2 can be laid in a serpentine shape along the shortest possible path. More specifically, each cell module 1 has the first cable fixing portion 95a, the second cable fixing portion 95b and the third cable fixing portion 95c, and each of the cable fixing portions 95a, 95b and 95c has a plurality of insertion holes 951 whose directions of insertion intersect with each other. Therefore, the communication cables 2 are appropriately oriented and fixed in arbitrary directions at the cable fixing portions 95a, 95b and 95c.

In addition, in the electric storage apparatus B including an array of a plurality of cell modules 1 described above, the cable fixing portion 95 disposed on a cell module 1 at the central point in the X direction faces the cable fixing portion 95 disposed on an adjacent cell module 1 at the central point in the X direction, or the pair of cable fixing portions 95 disposed on a cell module 1 at an interval from each other in the X direction face the pair of cable fixing portions 95 disposed on an adjacent cell module 1 at an interval from each other in the X direction. Therefore, the communication cables 2 can be laid and fixed along the shortest possible path between the cable fixing portions facing each other.

In addition, in the cell module 1 described above, the control board 93 is housed in the circuit case body 90, and the circuit case body 90 has connection terminals (the input connector 930 and the output connector 931) for the communication cables 2. Therefore, the communication cables 2 can be connected to the connection terminals of adjacent cell modules 1.

The electric storage module according to the present invention is not limited to the embodiment described above, and various modifications can be made without departing from the spirit of the present invention.

For example, in the above embodiment, a case has been described where the cell monitor circuit module 9 having the circuit case body 90 housing the cell monitor circuit is an outer package member. However, the outer package member is not limited to the cell monitor circuit module 9 and may be any circuit module other than the cell monitor circuit module 9. Furthermore, the outer package member may be a simple plate, rather than the circuit case body 90.

Furthermore, in the above embodiment, a case has been described where the insertion holes 951 are formed to penetrate the cable fixing portion 95 in two directions, the X direction and the Y direction. However, the insertion holes 951 may penetrate the cable fixing portion 95 in other directions than the X direction and the Y direction. The insertion holes 951 may penetrate the cable fixing portion 95 in three or more directions. Furthermore, the insertion hole 951 may be formed to extend in the X direction or Y direction to a middle point in the cable fixing portion 95 and then turn and extend in the Z direction. In other words, the insertion hole 951 may penetrate the cable fixing portion 95 in an L shape.

Furthermore, in the above embodiment, a case has been described where the cell module 1 has three cable fixing portions 95. However, the cell module 1 may have four or more cable fixing portions 95. Alternatively, the cell module 1 may have two cable fixing portions 95. Although in the above embodiment a case has been described where the second cable fixing portion 95b and the third cable fixing portion 95c are symmetrically disposed with respect to the first cable fixing portion 95a, the second cable fixing portion 95b and the third cable fixing portion 95c may be asymmetrically disposed with respect to the first cable fixing portion 95a.

Furthermore, in the above embodiment, a case has been described where the cable fixing portions 95 are formed integrally with the case 91. However, the cable fixing portions 95 may be separate from the case 91.

Furthermore, in the above embodiment, a case has been described where the communication cables 2 are used as cables. However, the cables may be electric wires such as bus bars. If the cables are electric wires, the cables (electric wires) do not have to be laid to intersect with the bus bars.

The electric storage apparatus B according to the embodiment described above includes four or three cell modules 1 arranged side by side. However, the electric storage apparatus B may include two cell modules 1 arranged side by side, or five or more cell modules 1 arranged side by side.

In the cell module according to the embodiment described above, the cell monitor circuit module 9 is disposed on the battery cells 3. However, another circuit case may be disposed on the battery cells 3 along with the cell monitor circuit module 9. In that case, the cable fixing portions 95 may be formed on the outer surface of the other circuit case. More specifically, the other circuit case has a circuit case body having an opening and a cover plate that covers the opening of the circuit case body. The cable fixing portions 95 are formed on the outer surface of the cover plate.

Furthermore, in the above embodiment, a lithium-ion secondary battery cell has been described. However, any type of cell with any size (capacity) is possible to be used.

The present invention is not limited to the lithium-ion secondary battery cell. The present invention can be applied to various types of secondary cells, primary cells and capacitors such as an electric double layer capacitor.

While the electric storage module according to the embodiments have been described above, it should be understood that the embodiments disclosed herein are illustrative and not limitative. The scope of the present invention is defined by the claims rather than by the preceding description, and all changes that fall within meets and bounds of the claims or equivalence of such meets and bounds are intended to be embraced by the claims.

What is claimed is:

1. An electric storage module, comprising:
   a plurality of rectangular electric storage devices aligned in an arrangement direction;
   a cable; and
   an outer package member that is disposed over the plurality of electric storage devices and covers the electric storage devices, the outer package member comprising a main body that covers the electric storage devices and a cable fixing portion protruding from and integrally formed with an outer surface of the main body, the outer surface being opposite to a surface that faces the electric storage devices, the cable being laid over the cable fixing portion,
   wherein the cable fixing portion includes an opening, through which the outer surface of the main body is exposed when viewed in a first direction in which the cable fixing portion protrudes, and a plurality of insertion holes for inserting a binding member in a second direction perpendicular to the first direction, directions of insertion of the insertion holes intersecting with each other, the insertion holes being communicated with the opening,
   wherein the cable fixing portion and the outer surface of the main body are exposed to outside of the electric storage module,
   wherein the outer package member includes a positive outside terminal to which a bus bar is configured to be connected and a negative outside terminal to which another bus bar is configured to be connected, and
   wherein the cable fixing portion orients and fixes the cable in such a manner that the cable is laid to intersect with the bus bar connected to the positive outside terminal or said another bus bar connected to the negative outside terminal.

2. The electric storage module according to claim 1, wherein the outer package member includes three or more cable fixing portions each including the cable fixing portion,
   wherein one of three cable fixing portions of the three or more cable fixing portions is disposed at a central point along one edge of the main body, and
   wherein a remaining two cable fixing portions of the three cable fixing portions are disposed at an interval along another edge of the main body.

3. The electric storage module according to claim 2, wherein the remaining two cable fixing portions of the three cable fixing portions are symmetrically disposed with respect to the one cable fixing portion of the three cable fixing portions.

4. The electric storage module according to claim 1, wherein the cable fixing portion is provided at such a point as not to interfere with the bus bar.

5. The electric storage module according to claim 1, further comprising:
   a control board that monitors the electric storage devices,
   wherein the main body comprises a connection terminal for a communication cable, the connection terminal being connected to the control board.

6. The electric storage module according to claim 1, wherein the outer package member comprises a circuit case that is disposed on the electric storage devices and forms the outer surface of the main body of the outer package member, and
   wherein the cable fixing portion is provided on an outer surface of the circuit case.

7. The electric storage module according to claim 6, wherein the circuit case comprises a circuit case body having an opening and a cover plate that covers the opening, and
   wherein the cable fixing portion is provided on an outer surface of the cover plate.

8. The electric storage module according to claim 1, wherein the binding member that is inserted through at least one of the plurality of insertion holes and fixed to the cable fixing portion and fixes the cable to the cable fixing portion.

9. The electric storage module according to claim 8, wherein the cable fixing portion includes two insertion holes opposed to each other at a distance, and
   wherein the binding member is inserted through the two insertion holes and fixed to the cable fixing portion.

10. The electric storage module according to claim 1, wherein the cable fixing portion includes two insertion holes opposed to each other at a distance in the second direction and two insertion holes opposed to each other at a distance in a third direction that intersects with the second direction.

11. The electric storage module according to claim 1, wherein the cable fixing portion comprises a plurality of walls standing on the outer surface of the main body, each wall including one of the insertion holes, and wherein tip ends of the walls define an opening through which the outer surface of the main body is exposed.

12. The electric storage module according to claim 11, wherein the binding member passes through the insertion holes of opposing walls of the plurality of walls of the cable fixing portion, the binding member crossing over an upper surface of the cable fixing portion.

13. The electric storage module according to claim 12, wherein the cable passes above the upper surface of the cable fixing portion, and wherein, above the upper surface of the cable fixing portion, the binding member passes above the cable.

14. An electric storage module, comprising:
a plurality of rectangular electric storage devices aligned in an arrangement direction; and
an outer package member that is disposed over the plurality of electric storage devices and covers the electric storage devices, the outer package member comprising a main body that covers the electric storage devices and a cable fixing portion provided on an outer surface of the main body,
wherein the cable fixing portion includes a plurality of insertion holes for inserting a binding member or a cable,
wherein the cable fixing portion comprises a plurality of walls standing on the outer surface of the main body, each wall including one of the insertion holes,
wherein tip ends of the walls define an opening through which the outer surface of the main body is exposed,
wherein the insertion holes are communicated with the opening,
wherein the cable fixing portion and the outer surface of the main body are exposed to outside of the electric storage module,
wherein the outer package member includes a positive outside terminal to which a bus bar is configured to be connected and a negative outside terminal to which another bus bar is configured to be connected, and
wherein the cable fixing portion orients and fixes the cable in such a manner that the cable is laid to intersect with the bus bar connected to the positive outside terminal or said another bus bar connected to the negative outside terminal.

15. The electric storage module according to claim 1, wherein the binding member passes through the insertion holes of opposing walls of the plurality of walls of the cable fixing portion, and wherein the cable is laid over the cable fixing portion.

16. The electric storage module according to claim 15, wherein the cable passes above an upper surface of the cable fixing portion, and wherein, above the upper surface of the cable fixing portion, the binding member passes above the cable.

17. The electric storage module according to claim 14, wherein the cable fixing portion protrudes, in a direction perpendicular to the arrangement direction, from the outer surface of the main body.

18. The electric storage module according to claim 17, wherein the cable fixing portion is an integral part of the outer surface of the main body.

19. The electric storage module according to claim 14, wherein the cable fixing portion is an integral part of the outer surface of the main body.

* * * * *